(12) United States Patent
Parkvall et al.

(10) Patent No.: US 11,711,175 B2
(45) Date of Patent: Jul. 25, 2023

(54) METHODS AND APPARATUSES FOR CONTROLLING TIMING OF FEEDBACK TRANSMISSIONS

(71) Applicant: Telefonaktiebolaget LM Ericsson (publ), Stockholm (SE)

(72) Inventors: Stefan Parkvall, Bromma (SE); Robert Baldemair, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 20 days.

(21) Appl. No.: 17/331,680

(22) Filed: May 27, 2021

(65) Prior Publication Data

US 2021/0288760 A1  Sep. 16, 2021

Related U.S. Application Data

(63) Continuation of application No. 16/564,776, filed on Sep. 9, 2019, now Pat. No. 11,070,326, which is a continuation of application No. 15/754,662, filed as application No. PCT/SE2015/051120 on Oct. 21, 2015, now Pat. No. 10,447,440.

(60) Provisional application No. 62/221,345, filed on Sep. 21, 2015.

(51) Int. Cl.
*H04L 1/1867* (2023.01)
*H04L 1/1812* (2023.01)
*H04L 1/1607* (2023.01)

(52) U.S. Cl.
CPC .......... *H04L 1/1887* (2013.01); *H04L 1/1812* (2013.01); *H04L 1/1896* (2013.01); *H04L 1/1685* (2013.01)

(58) Field of Classification Search
CPC ... H04L 1/1887; H04L 1/1812; H04L 1/1896; H04L 1/1685
See application file for complete search history.

(56) References Cited

U.S. PATENT DOCUMENTS 7,043,210 B2 * 5/2006 Zhu .................. H04L 1/1854
370/204
8,149,812 B2   4/2012 Shin et al.
(Continued)

FOREIGN PATENT DOCUMENTS

CN  104468030 A  3/2015
CN  104641573 A  5/2015
(Continued)

OTHER PUBLICATIONS

"5G—Key Component of the Networked Society", 3GPP RAN Workshop on 5G, RWS-150009, Ericsson, Phoenix, AZ, USA, Sep. 17-18, 2015, 55 pages.
(Continued)

*Primary Examiner* — Chandrahas B Patel
(74) *Attorney, Agent, or Firm* — Murphy, Bilak & Homilier, PLLC (57) ABSTRACT

There is disclosed a method for controlling the timing of feedback transmissions by a communication device communicating over a communication link, wherein the communication link supports a retransmission scheme. The method comprises transmitting a feedback timing indicator, FTI, wherein the indicator is selected from a set of indicators.

10 Claims, 9 Drawing Sheets

(56) References Cited

U.S. PATENT DOCUMENTS

| | | | |
|---|---|---|---|
| 8,325,650 B2* | 12/2012 | Hu | ................. H04L 1/1845 370/328 |
| 8,498,228 B2 | 7/2013 | Lee et al. | |
| 9,584,348 B2 | 2/2017 | Morioka | |
| 10,491,341 B2* | 11/2019 | Martin | ................. H04L 1/22 |
| 2006/0035589 A1 | 2/2006 | Shvodian | |
| 2009/0276676 A1 | 11/2009 | Lee et al. | |

FOREIGN PATENT DOCUMENTS

| | | |
|---|---|---|
| EP | 1553718 A1 | 7/2005 |
| EP | 2615882 A1 | 7/2013 |
| JP | 2002223214 A | 8/2002 |
| JP | 2012060526 A | 3/2012 |
| WO | 2008131971 A1 | 11/2008 |
| WO | 2014049169 A1 | 4/2014 |
| WO | 2014088477 A1 | 6/2014 |
| WO | 2014130694 A1 | 8/2014 |

OTHER PUBLICATIONS

"5G Vision for 2020 and Beyond", 3GPP RAN Workshop on 5G, RWS-150051, NTT Docomo, Inc., Phoenix, AZ, USA, Sep. 17-18, 2015, 23 pages.

* cited by examiner

METHODS AND APPARATUSES FOR CONTROLLING TIMING OF FEEDBACK TRANSMISSIONS

RELATED APPLICATIONS

This application is a continuation of U.S. application Ser. No. 16/564,776 filed 9 Sep. 2019, which is a continuation of U.S. application Ser. No. 15/754,662 filed 23 Feb. 2018 and issued as U.S. Pat. No. 10,447,440, which is a U.S. National Phase Application of PCT/SE2015/051120 filed 21 Oct. 2015, which claims benefit of U.S. Provisional Application No. 62/221,345 filed 21 Sep. 2015. The entire contents of each aforementioned application is incorporated herein by reference.

TECHNICAL FIELD

Embodiments herein relate to telecommunications and or data communications in general and in particular to methods and apparatuses for controlling timing of feedback transmissions when Automatic Repeat Request-(ARQ) and/or Hybrid Automatic Repeat Request (HARQ) re-transmission schemes are used.

BACKGROUND

Modern wireless communication systems use re-transmission schemes, often denoted as Automatic Repeat Request (ARQ). In an ARQ scheme a data packet, transmitted from a transmitter, is appended with a CRC. A receiver decodes the data packet, re-calculates the CRC and compares the obtained CRC with the transmitted CRC. If the CRC matches, an acknowledgement (ACK) is sent as feedback to the transmitter to indicate that the corresponding data packet was received correctly, otherwise a negative acknowledgment (NACK) is sent as feedback to the transmitter to indicate that the data packet was not received correctly. Based on such feedback (ACK or NACK) the transmitter can retransmit the corresponding data packet if the feedback was a NACK.

In case the feedback is a NACK, the time for successful data transmission is at least the time required for providing the feedback and to re-transmit the data from the transmitter. The time duration between a transmission and a consecutive re-transmission may be called a re-transmission round trip time.

In LTE and other wireless communication systems, both FEC (Forward Error Correction) encoding and ARQ may be applied, this is also known as Hybrid ARQ (HARQ). HARQ is used in HSDPA and HSUPA which provide high speed data transmission (on downlink and uplink, respectively) for mobile phone networks such as UMTS, and in the IEEE 802.16-2005 standard for mobile broadband wireless access, also known as "mobile WiMAX". It is also used in EVDO and LTE wireless networks.

Figure 1:
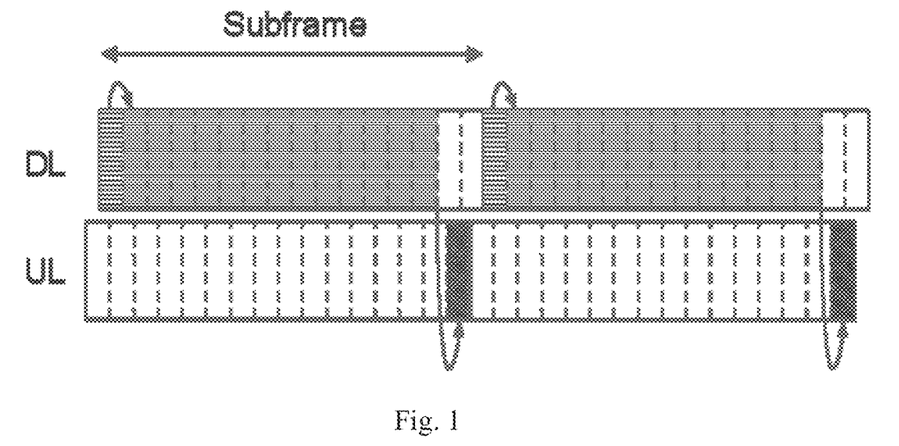
FIG. 1 illustrates an example of a frame structure for a 5G TDD system with low latency feedback signaling.

Type I Hybrid ARQ is used in ITU-T G.hn, a high-speed Local area network standard that can operate at data rates up to 1 Gbit/s over existing home wiring (power lines, phone lines and coaxial cables). G.hn uses CRC-32C for Error Detection, LDPC for Forward Error Correction and Selective Repeat for ARQ. One of the improvement areas over LTE, will in 5G communication systems be latency. In LTE, HARQ feedback is transmitted several subframes later from the receiver to the transmitter. In LTE one subframe spans 1 ms resulting in a latency of the lower layer re-transmission protocol of several ms. To reduce this duration, 5G communication systems may have a frame structure where the feedback can be sent at the end of the subframe, in which the corresponding data is transmitted. FIG. 1 depicts an example TDD frame structure enabling such feedback transmission. Since full-duplex is not yet a viable solution, the Down-Link (DL) transmission has to stop some time before the Up-Link (UL) transmission can start to enable the receivers to switch from transmit to receive and vice versa. This time, from stopping the DL transmission until UL transmission starts, may be called a guard period. The guard period may also include possible timing advance, which may be used to compensate for propagation delay and thereby provide a suitable timing for e.g. wireless devices or UEs to enable synchronization at e.g. an eNB or base station.

Figure 2:
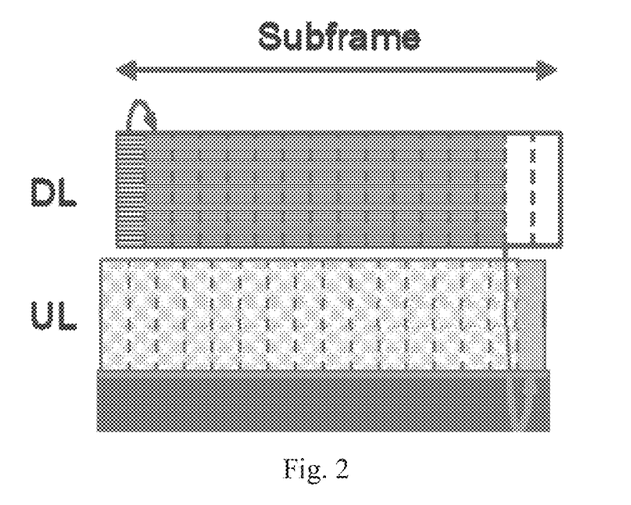
FIG. 2 illustrates an example of a frame structure for 5G FDD system with low latency feedback signaling.

For FDD, system full duplex operation is feasible and consequently UL- and DL-transmissions can overlap as indicated in FIG. 2. The overlap may mean that e.g. there may be concurrent transmissions on UL and DL. As an example, retransmission feedback in a UL subframe may be transmitted while data packets are transmitted in the corresponding DL subframe. However, to be able to send the feedback signal in an UL subframe, before expiry or at the end of the DL subframe, even for FDD, the downlink transmission would have to stop early and thereby wasting DL resources at the end of the transmitted subframe. Using these "wasted" DL resources for the next DL subframe is not desirable since this creates dependency between subframes.

The frame structure outlined above and shown in FIG. 1 requires a duplex direction switch for TDD every subframe. Every duplex direction switch, with the corresponding guard period, will result in that some symbols in every DL subframe cannot be used. A similar effect is expected for FDD, as described in relation to FIG. 2, since the last symbols in a DL subframe are not used since that usage would create an inter dependency between DL subframes which is not desirable.

Therefore, for both TDD and FDD, there is a risk of not efficiently utilizing the full capacity of the channels since parts of the allocated resources cannot be used in every subframe in a communication system with a frame structure where the feedback can be sent at the end of the subframe in which a corresponding data packet is transmitted.

Providing retransmission feedback in the same subframe could—depending on the decoder implementation—be more battery consuming since the terminal has very short time to decode the received data. If the application requires short latency this is acceptable, however, if an application does not require low latency it could be beneficial to provide the terminal with more time for decoding and thus enable potential energy savings.

Consequently, if feedback is provided promptly there is a risk that the channel is not fully utilized and that the UE power consumption increases.

SUMMARY

It is an object of embodiments described herein to address at least some of the problems and issues outlined above. It is possible to achieve this object and others by using methods and communication devices, such as transmitting devices and receiving devices, as defined in the attached independent claims.

According to one aspect, a method for controlling the timing of feedback transmissions by a communication device, communicating over a communication link, wherein the communication link supports a re-transmission scheme and wherein the method comprises transmitting a feedback timing indicator, FTI, wherein the indicator is selected from a set of indicators.

According to another aspect, a communication device, comprising a processor and a memory, wherein the memory comprises instructions executable by the processor whereby the communication device is operative to and/or adapted to control the timing of feedback transmissions for communication over a communication link, wherein the communication link supports a retransmission scheme and wherein the communication device is further adapted to transmit a feedback timing indicator, FTI, wherein the indicator is selected from a set of indicators.

According to another aspect, a method for transmitting retransmission feedback by a communication device, communicating over a communication link, wherein the communication link supports a re-transmission scheme and wherein the method comprises receiving a feedback timing indicator, FTI, and transmitting retransmission feedback based on the feedback timing indicator.

According to another aspect, a communication device, comprising a processor and a memory, wherein the memory comprises instructions executable by the processor whereby the communication device is operative to and/or adapted to transmit retransmission feedback for communication over a communication link, wherein the communication link supports a re-transmission scheme and wherein the communication device is further adapted to receive a feedback timing indicator, FTI, and transmit retransmission feedback based on the feedback timing indicator.

The above communication devices and methods therein may be implemented and configured according to different optional embodiments to accomplish further features and benefits, to be described below.

Some of the advantages achieved by the methods and the corresponding radio network node and wireless devices may be compiled as:
   enabling flexible timing of retransmission feedback
   enabling trade-off between latency and capacity
   enabling short latency if load is low
   avoiding inter dependency between subframes
   optimizing a trade-off between fulfilling latency requirements and saving battery in case of poor radio coverage.

BRIEF DESCRIPTION OF THE DRAWINGS

The solution will now be described in more detail by means of exemplary embodiments and with reference to the accompanying drawings, in which.

DETAILED DESCRIPTION

The communication system wherein the embodiments herein are applied may use retransmission schemes to ensure that data streams are delivered accurately to the users, despite errors that may occur during transmission. Examples of such retransmissions schemes may be ARQ and/or HARQ as defined in e.g. 3GPP for UMTS and/or LTE.

One characteristic introduced by the frame structure outlined above, is that retransmission feedback can be sent, by a receiving device, such that the transmitting device can receive retransmission feedback related to data packets transmitted in a certain subframe, before said subframe has ended or timed out. A frame structure that provides the possibility for this feedback may require, for e.g. TDD, a duplex direction switch in every subframe and thereby introducing a corresponding guard period overhead in every subframe. This would imply an underutilization of the communication link, corresponding to the guard period for every subframe. Similarly, for FDD as stated previously, in order to avoid interdependency between subframes, the last symbols of a subframe should not be used in a subframe if retransmission feedback is requested in the same and/or corresponding subframe.

Figure 3:
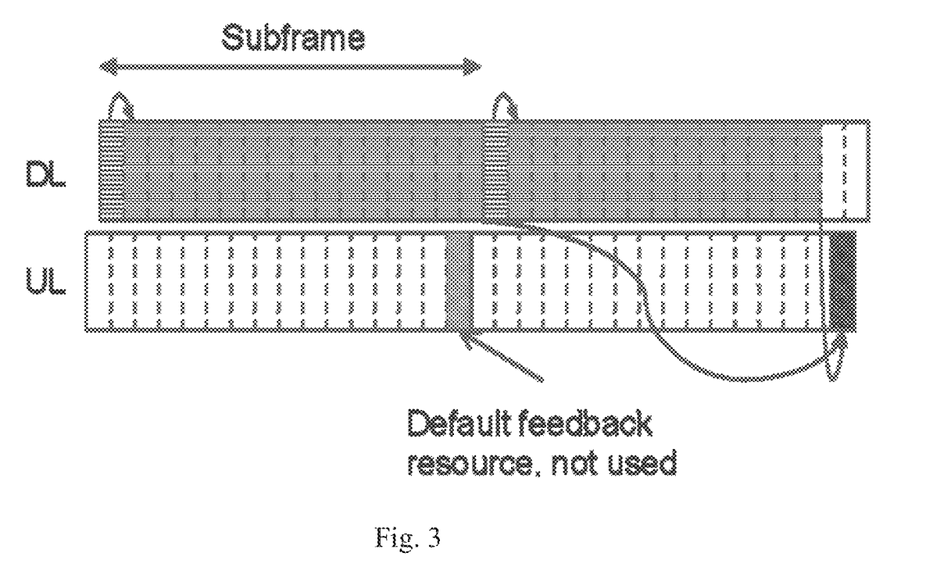
FIG. 3 illustrates an example with downlink heavy transmission with delay tolerant traffic implying that less frequent and/or aggregated feedback can be used which reduces the number of duplex direction switches.

However, in some applications somewhat more latency may be afforded since low latency is not anticipated to be important in all use cases. In this application it is anticipated that 5G communication systems should enable low latency in traffic cases where it is needed but should not unnecessarily enforce low latency for all traffic scenarios if there is a cost but little gain, related to the low latency. For example, for DL heavy transmissions without strict latency requirements, an aggregated feedback for several subframes could be sent. In this way the amount of switching times is reduced and so is the overhead. See FIG. 3 for an example where the feedback of two DL subframes is aggregated.

In this application two traffic types are referred to: delay sensitive traffic (e.g. voice, video and/or time-critical MTC) and delay tolerant traffic (e.g. background data and/or best effort data).

Figure 7:
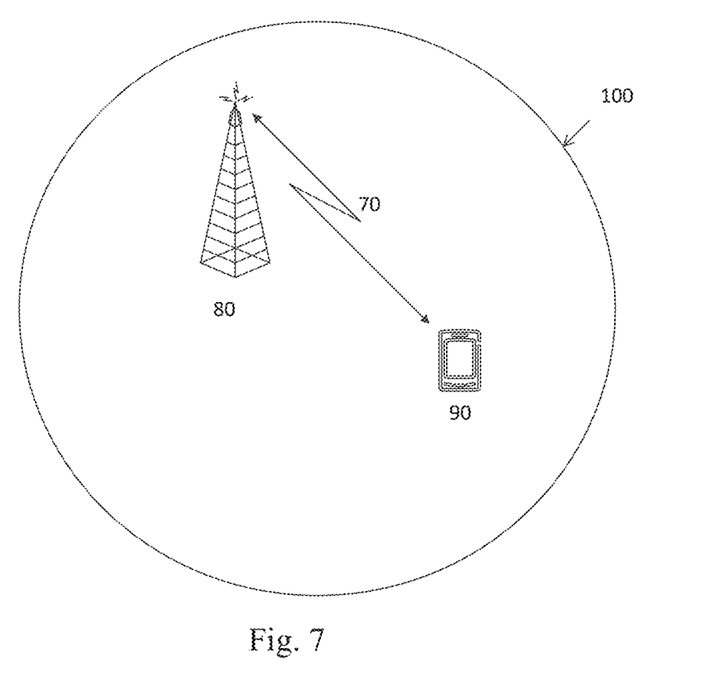
FIG. 7 illustrates an exemplary communication network in which embodiments herein may be applied and/or implemented.
Figure 8:
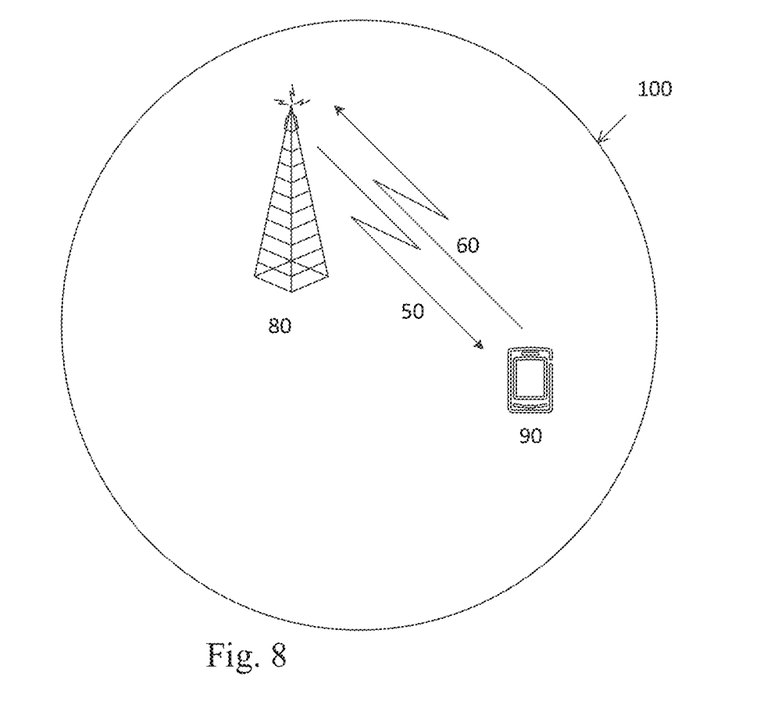
FIG. 8 illustrates an exemplary communication system in which embodiments herein may be applied and/or implemented.

Now referring to FIG. 7, which illustrates a communication system, 100, comprising two communication devices, 80 and 90. The communication devices are communicating over a communication link, 70. A communication link may comprise an uplink, UL, 60, and a downlink. DL, 50, as illustrated in FIG. 8. It shall be noted that in this disclosure, that an UL subframe, meaning that it comprises retransmission feedback, may be carried on the DL, 50, in case the communication device 90 has the role of transmitting device.

Providing feedback in the same subframe could—depending on the decoder implementation—be more battery consuming since the terminal has very short time to decode the received data. If the application requires short latency this is acceptable, however, if an application does not require low latency it could be beneficial to provide the terminal with more time for decoding and thus enable potential energy savings.

Figure 4:
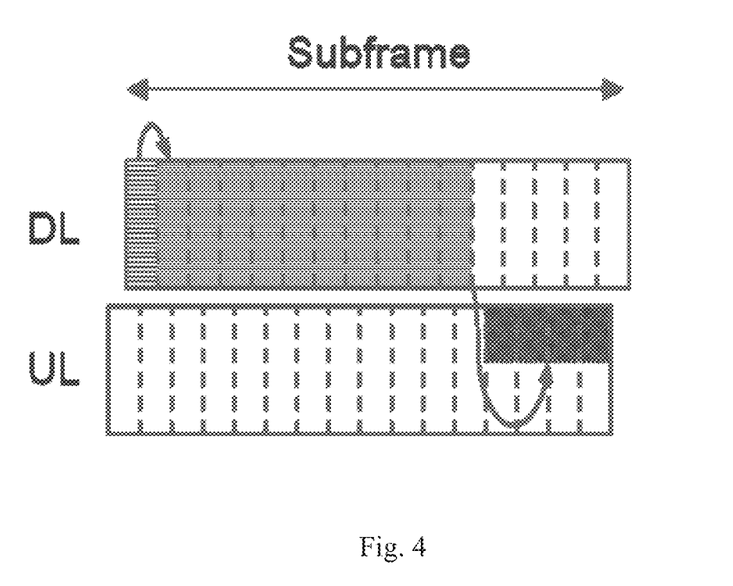
FIG. 4 illustrates that a coverage limited communication device must use long feedback signals to ensure coverage.

Coverage of the feedback signal is determined by the energy with which the feedback signal is transmitted. A coverage limited terminal already transmitting at max output power can only increase its transmission energy and thus coverage, by longer feedback signal durations. Given a fixed subframe length providing long feedback in every subframes leaves only little time for DL transmissions, see FIG. 4, which shows how a coverage limited terminal must use long feedback signals to ensure coverage. Consequently, if feedback is sent in every subframe, not much time is left for DL transmissions. It would be more efficient utilization of the communication channel and/or the communication link, 70, to transmit the feedback more seldom.

Briefly described, a solution is provided to ensure that a communication system, 100, which supports a low delay retransmission feedback, can also provide a mechanism to alleviate the problem of underutilization of DL resources which is introduced with low delay feedback as described above.

Referring to FIG. 7 again, there is illustrated a communication system 100 wherein embodiments herein may be employed or applied. Two communication devices are shown and denoted 80 and 90. A communication link, 70, supporting a retransmission scheme is also shown. For the sake of simplicity, the communication device 80 may be an eNB and will have the role of a transmitting device, whereas the communication device 90 may be a UE, which will have the role of a receiving device in relation to the retransmission scheme.

It should be mentioned that a transmitting device, 80, may transmit a scheduling command. A scheduling command may be transmitted together with a data packet. The scheduling command may comprise information on when retransmission feedback (e.g. HARQ ACK/NACK) shall be transmitted by the receiving device, 90.

Figure 5A:
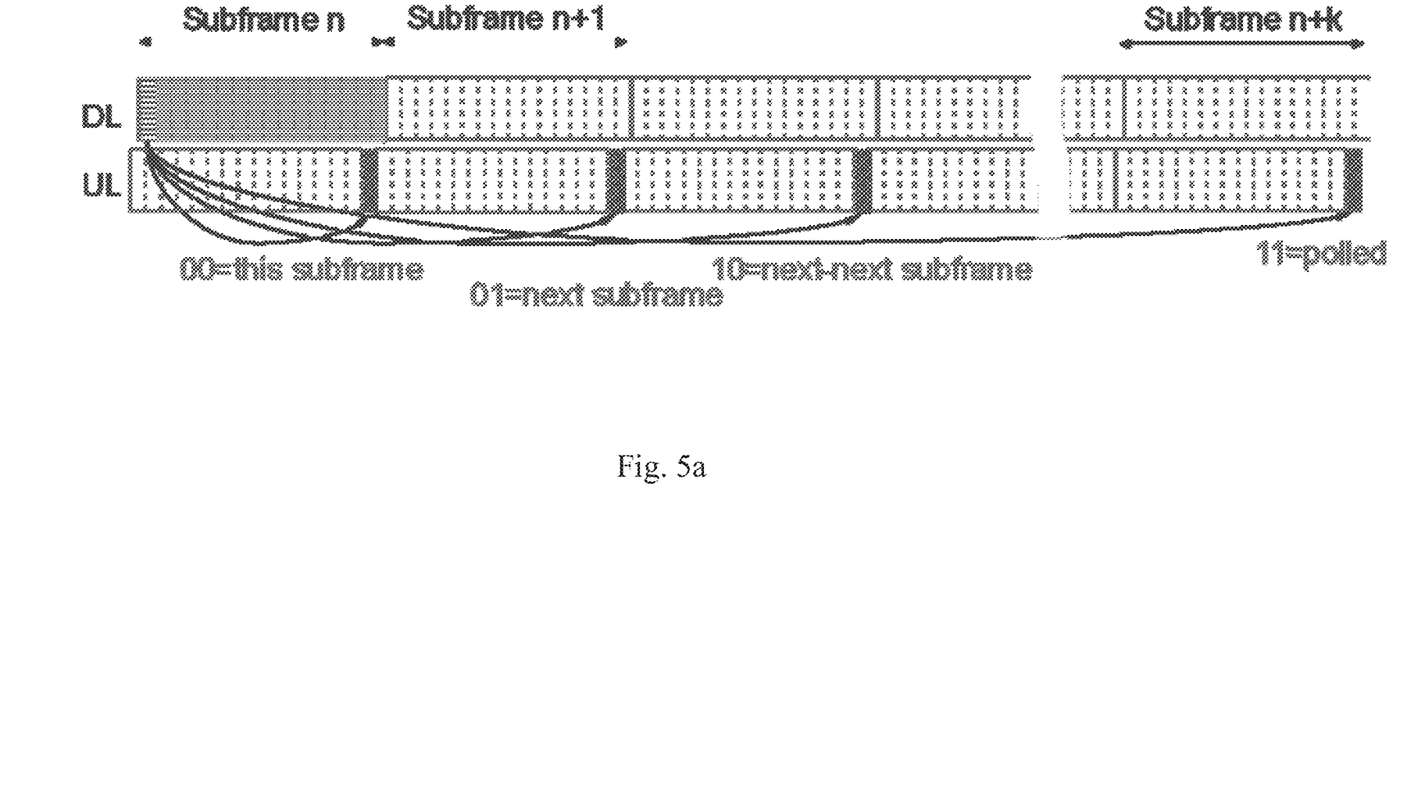
FIG. 5a illustrates an example of how a Feedback Timing Indicator, FTI, may indicate when retransmission feedback is requested.

FIG. 5 depicts a DL transmission. In the UL, different subframes and/or time instances and/or symbols, are indicated as potential retransmission feedback occasions related to the DL transmission. In this example the information provided in the scheduling command could be a two-bit word with the interpretations listed in Table 1.

TABLE 1

Different possibilities to provide feedback for the example in FIG. 5

| Code word | Interpretation |
|---|---|
| 00 | This subframe |
| 01 | Next subframe |
| 10 | Next-next subframe |
| 11 | Polled, eNB request feedback when it wants (with another DCI sometime in the future) |

TABLE 1-continued

Different possibilities to provide feedback for the example in FIG. 5

| Code word | Interpretation |
|---|---|

In other words, it can be said that the scheduling command may comprise a timing indicator, indicating when retransmission feedback shall be transmitted by the receiving device, 90. Such a timing indicator, will be called a Feedback Timing Indicator, FTI. One example of a FTI is shown in Table 1 and another example of an FTI is depicted in Table 2.

TABLE 2

Another example of how to signal the feedback timing.

| Code word | Interpretation |
|---|---|
| 0 | This subframe |
| 1 | Polled, eNB request feedback when it wants (with another DCI sometime in the future) |

Of course any number of bits, different from 2 bits (4 possibilities) as in Table 1, and 1 bit (two possibilities) as in Table 2, could be used to indicate a timing for retransmission feedback in case another granularity is suitable. It shall be mentioned that that the FTI may indicate e.g. symbols within a subframe, subframes, or a combination thereof.

The interpretation of the different code words in the tables may e.g. be configurable or depend on other scheduling information such as the scheduled data rate and/or MIMO stream and/or number of MIMO streams and/or transport block size and/or available resources on the communication link and/or retransmission buffer fill level etc.

There may also be a default way to transmit the feedback. An example of a default way of transmitting retransmission feedback could e.g. be to transmit the retransmission feedback at the end of the current subframe as indicated in e.g. FIG. 2. In this case no explicit retransmission feedback timing information would be provided. Such information would only be included in e.g. the scheduling command, if the retransmission feedback should be sent with a different timing than a default option.

The signaled timing (i.e. when to send the feedback) could also determine whether the full subframe is used for data or not. Using Table 1 as an example, code word 00 would mean that feedback is required in this subframe and that the corresponding DL data packet transmission needs to be finished a bit earlier. The last part of the downlink subframe is not used as shown in FIG. 2. Code word 01, on the other hand, would mean that the full subframe can be used for data transmission as the feedback is not supposed to come until next consecutive subframe. Similarly for code words 10 and 11.

It should be mentioned that that the above example is not limited to the DL between eNB and UE. It can be used on any communication link between e.g. eNBs, or between UEs, or between any two devices in a communication system using a retransmissions scheme such as ARQ and/or HARQ, for communication.

The problems described above are addressed by the exemplary embodiments herein providing methods and apparatuses in terms of a communication device, 80, for controlling timing of feedback transmissions by transmitting a Feedback Timing Indicator (FTI) and in terms of a communication device, 90, for transmitting retransmission feedback by receiving a feedback timing indicator and transmitting retransmission feedback based on the feedback timing indicator.

The solution is defined by the appended claims.

Referring to FIG. 7 again, there is illustrated a communication network 100 wherein embodiments herein may be employed or applied. Two communication devices are shown and denoted 80 and 90. A communication link, 70, is also shown.

In the following and according to embodiments herein, there is provided a method performed by/in a communication device 80 of a communication system 100, for controlling the timing of feedback transmissions related to ARQ and/or HARQ.

Figure 10:
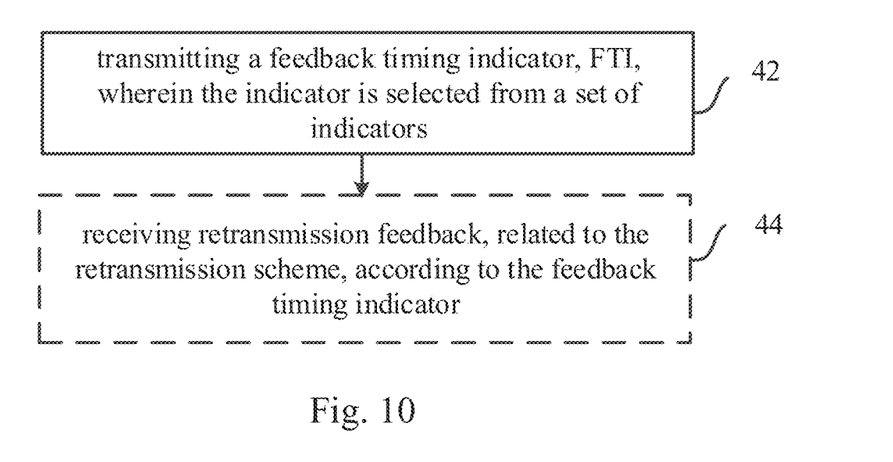
FIG. 10 illustrates a method performed in a communication device 80 according to embodiments herein.

The method is shown in FIG. 10 and comprises: transmitting, 42, a feedback timing indicator, FTI, wherein the indicator is selected from a set of indicators.

Figure 5B:
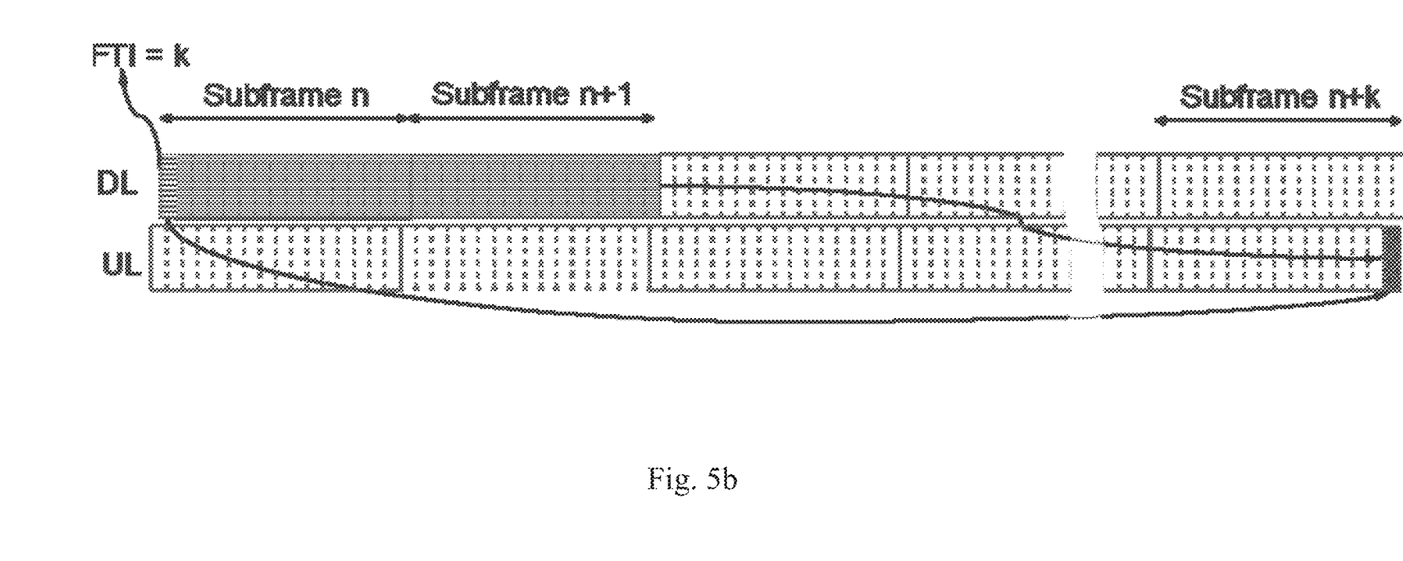
FIG. 5b illustrates an example of how retransmission feedback may be provided for a bundle of data subframes, in the same feedback transmission. It also illustrates an example of a Feedback Timing Indicator, FTI, which may indicate a subframe relative to the subframe in which the FTI is transmitted.
Figure 5C:
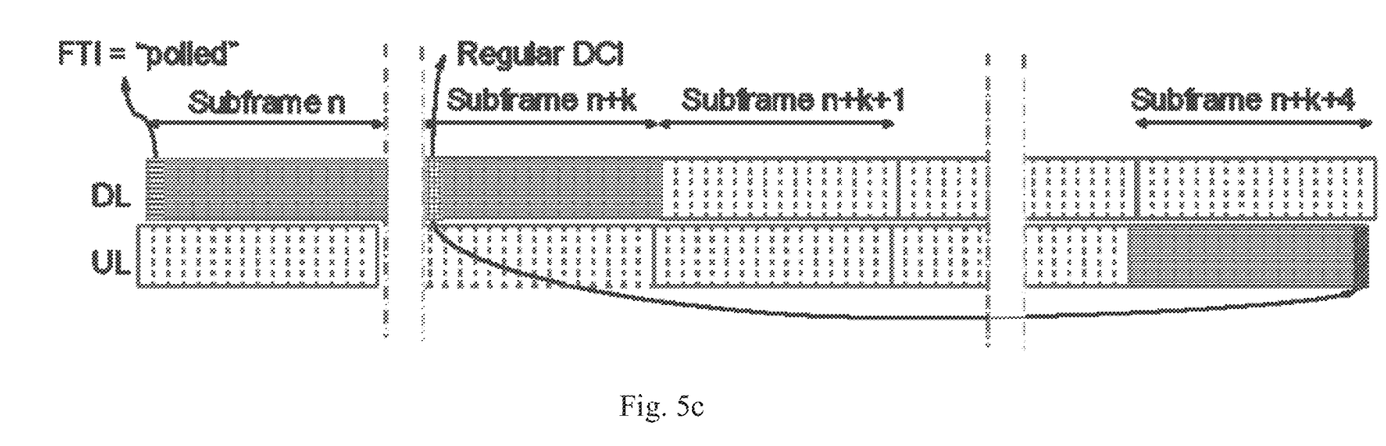
FIG. 5c illustrates an example of a transmitting device, indicating that request for feedback will come in a later subframe.

The method is implemented and performed by/in the communication device 80 as described above. The actions performed by the communication device 80 will now be described in conjunction with FIG. 10 and include:

In action 42, the communication device 80 is configured and/or adapted to transmit a Feedback Timing Indicator, FTI. The feedback relates to a data transmission from the communication device, 80, which uses a retransmission scheme for communication with the other communication device, 90, in FIG. 7. The FTI may be selected from a set of different indicators. Each FTI may represent a time structure, such as e.g. a specific subframe and/or slot and/or radio frame and/or transmission time interval, TTI, in which retransmission feedback is requested by the communication device, 80. The FTI may also represent a relative time structure in relation to in which time structure the FTI is transmitted. E.g. if the FTI is transmitted in subframe n, the FTI may indicate a subframe n+k, where subframe n is the subframe in which the FTI is transmitted. The FTI may be transmitted in a Downlink Control Information, DCI, as defined in e.g. LTE. The DCI may comprise FTI which may be valid for several DL subframes. e.g. until next DCI is transmitted. It shall be mentioned that the FTI is not necessarily transmitted in every DL subframe. In some embodiments, the communication device may be semi-statically configured with a preconfigured FTI, wherein the preconfigured FTI may be configured with L3 signalling such as e.g. RRC signaling according to e.g. 3GPP. A DCI may also schedule a bundle of subframes and the feedback of the complete bundle is provided in the same feedback transmission. In this case the FTI refers to the timing of the feedback transmission carrying feedback for the bundle. See e.g. FIG. 5b wherein the bundle of subframes are subframe n and subframe n+1 and the retransmission feedback is of the complete bundle is received in subframe n+k. In another example, the FTI may indicate no specific frame and/or subframe, in which the retransmission feedback is requested, but instead a future FTI and/or DCI will be transmitted by the transmitting device. The future FTI and/or DCI will indicate when feedback is requested. This scenario illustrated in FIG. 5c, where the transmitting device 80, may transmit an FTI indicating "polled" feedback in a DL subframe n. In a future DL subframe, a DCI with an UL grant is transmitted by the transmitting device 80, wherein the DCI indicates that the retransmission feedback is requested in a specific future UL subframe n+k+4. However, it shall be noted that the DCI is not restricted to indicate future UL subframe n+k+4, but any suitable future UL subframe may be indicated. An FTI indicating "polled" feedback is described in relation to Table 1 above.

According to an embodiment, the FTI may be selected based on scheduling information in the communication device, 80. E.g. if the communication link, 70, over which the communication is ongoing, experiences low load, and consequently there are a lot of free resources, it can be envisioned that the underutilization of the communication link is not as crucial as when there is high load. Therefore, no trade-off between capacity and latency may be required to fulfill quality of service for the traffic and consequently shorter latency can be provided without putting any constraints to the offered traffic. Other scheduling info which may be useful in selecting the FTI can be traffic type. If the communication device, 80, schedules delay tolerant data, the FTI can be selected to not request retransmission feedback very early and thus not introduce the undesired effects of underutilization of the communication link. Scheduling information may comprise e.g. number of MIMO streams, transport block (TB) size of a data packet, retransmission buffer size of the communication device, 80, available resource blocks and/or capacity of the communication link and/or Frequency Bandwidth of the communication link. It shall be mentioned that scheduling information mentioned above may relate to the size and/or amount of transmitted data and/or the transmitted data bit rate. E.g. the higher the number of available MIMO streams, the larger the TB size and the more available resources imply a larger amount of transmitted data and/or bit rate of the transmitted data. Consequently, the more complex decoding for the receiving device, 90. Therefore, in order to facilitate for the receiving device, 90, the transmitting device, 80, may request feedback at a later stage compared to when the amount of transmitted data is low and/or the transmitted data rate is low and thereby relaxing the processing and/or decoding requirements on the receiving device, 90. E.g. relaxing the processing and/or decoding requirements on the receiving device 90 could be done by indicating a later subframe by means of the FTI. E.g. the transmitting device 80, may indicate that the retransmission feedback is requested in e.g. the "10=next-next subframe" according to table 1 and FIG. 5, as opposed to e.g. "00=this subframe", in order to relax the decoding and/or processing requirements in the receiving device 90.

In one exemplary embodiment, the method also comprises the optional step 44, of receiving retransmission feedback, related to the retransmission scheme, according to the feedback timing indicator. E.g., if the FTI is transmitted by the communication device, 80, in a subframe n and the FTI indicates that the retransmission feedback shall be transmitted by the other communication device, 90, in e.g. subframe n+1, the communication device, 80, receives the retransmission feedback in subframe n+1.

In another exemplary embodiment, the method also comprises transmitting data together with the Fri. If. e.g. the FTI is transmitted by the communication device, 80, in a subframe n there is also DL data transmitted in subframe n. If, in this exemplary embodiment, the FTI e.g. indicates that the communication device, 80, requests retransmission feedback in subframe n (same subframe) the transmitted DL data may be arranged and/or formatted and/or scheduled to not occupy the full subframe since the retransmission feedback may only relate to data received by the communication device, 90, prior to transmitting the retransmission feedback which may be prior to the end of the DL subframe n as indicated in e.g. FIGS. 1 and 2. This will support avoiding inter dependency between the subframes as discussed above.

Hence, a time structure. e.g. a subframe may be reformatted and/or arranged and/or scheduled based on the FTI.

In another exemplary embodiment. FTI may be transmitted in e.g. subframe n, together with data. FTI may indicate a future subframe, relative to the subframe in which the FTI is transmitted. See e.g. FIG. 5b, where it is illustrated that the FTI indicates that retransmission feedback is requested for data, which has been transmitted in and/or after subframe n, in subframe n+k. In this particular example, the FTI indicates that retransmission feedback is requested in a subframe relative to the subframe in which the FTI was transmitted. In other exemplary embodiments, the FTI may indicate a subframe relative to when the data was transmitted.

According to the above, the main steps performed by a communication device, 80, for controlling the timing of feedback transmissions may be summarized as follows and are shown in FIG. 10:

transmitting 42 a feedback timing indicator, FTI, wherein the indicator is selected from a set of indicators.

As disclosed above there are some advantages achieved by carrying out the method e.g.:
  enabling flexible timing of retransmission feedback
  enabling trade-off between latency and capacity
  enabling short latency if load is low
  avoiding inter dependency between subframes
  optimizing a trade-off between fulfilling latency requirements and saving battery in case of poor radio coverage.

According to embodiments herein, there is further provided a communication device 80 adapted to control the timing of feedback transmissions for communication over a communication link 70, wherein the communication link supports a retransmission scheme and wherein the communication device 80 is further adapted to transmit a feedback timing indicator, FTI, wherein the indicator is selected from a set of indicators.

Details regarding features of the corresponding method embodiment have already been provided above so it is considered unnecessary to repeat such details. This goes for all embodiments related to the communication device 80 that will be disclosed below.

In an exemplary embodiment, the communication device 80 is disclosed wherein the selection of the FTI is based on scheduling information.

In another exemplary embodiment, the communication device 80 is disclosed, wherein the first time interval and the second time interval are of different length.

In another exemplary embodiment, the communication device 80 is disclosed, wherein the scheduling information comprises at least one of: number of MIMO streams, transport block (TB) size of a data packet, retransmission buffer size, available resource blocks of the communication link, Frequency Bandwidth of the communication link, Traffic type In an additional exemplary embodiment, the communication device 80 is disclosed, wherein the feedback timing indicator indicates a time structure In yet another exemplary embodiment, the communication device 80 is disclosed, wherein the time structure comprises one of: a transmission time interval, a subframe, a radio frame, a symbol time length, a symbol In an exemplary embodiment, the communication device 80 is further adapted to: receive retransmission feedback, related to the retransmission scheme, according to the feedback timing indicator.

In another exemplary embodiment, the communication device 80 is disclosed, wherein transmit the FTI further comprises transmitting data.

In another exemplary embodiment, the communication device 80 is disclosed, wherein a format and/or scheduling and or arrangement of the data is based on the FTI.

In yet another exemplary embodiment, the communication device 80 is disclosed, wherein the data comprises at least one data packet.

According to embodiments herein, there is further provided, as disclosed above a communication device 80, comprising a processor and a memory, wherein the memory comprises instructions executable by the processor whereby the communication device 80 is operative to and/or adapted to perform the main steps for controlling he timing of feedback transmissions may thus be summarized as follows and is shown in FIG. 10:

transmit a feedback timing indicator, FTI, wherein the indicator is selected from a set of indicators As disclosed above the same advantages as previously disclosed in relation to the method performed by/in the communication device 80 are hereby also achieved.

Figure 11:
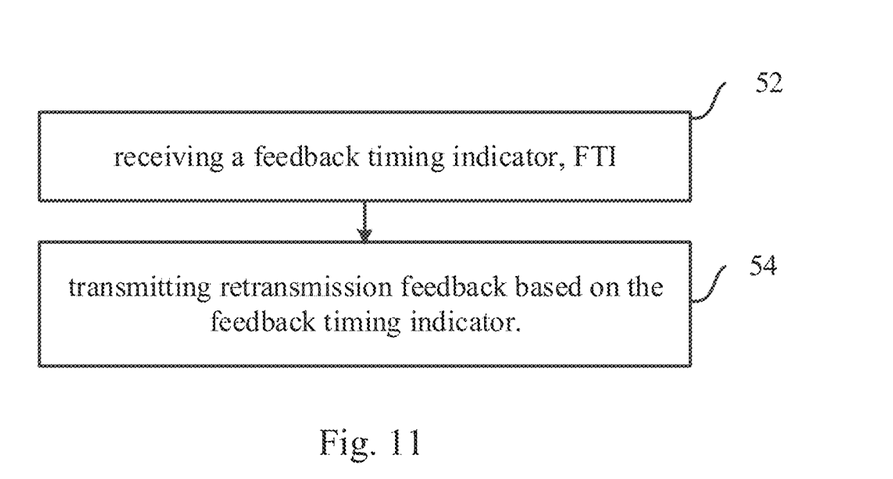
FIG. 11 illustrates a method performed in a communication device 90 according to embodiments herein.

In the following and according to embodiments herein, there is provided a method performed by/in a communication device 90, communicating over a communication link 70. The method is illustrated in FIG. 11 and comprises: receiving a feedback timing indicator, FTI, and transmitting retransmission feedback based on the feedback timing indicator.

The method is implemented and performed by/in the communication device 90, as described above. The actions performed by the communication device 90 will now be described in conjunction with FIG. 11 and include:

In action 52, the communication device 90 is configured and/or adapted to receive, from a communication device 80, a feedback timing indicator, FTI. The FTI may be received in a time structure, such as e.g. a subframe or transmission time interval or symbol or radio frame.

In action 54, the communication device may decode the specified time structure to obtain the FTI and/or data received in the time structure. Based on the FTI, the communication device determines in which time structure, e.g. in which subframe, the feedback is requested. Examples of this determination can be found in relation to descriptions of FIG. 5a-c and. Table 1 or Table 2 above. In case the time structure comprises data, the communication device 90 may calculate the CRC for the data to obtain the related retransmission feedback. Then the communication device 90 transmits the related feedback in the determined and/or indicated time structure, e.g. a subframe, in particular a UL subframe.

In one exemplary embodiment, the FTI indicates a time structure as mentioned above. The time structure may be one of:
  a transmission time interval
  a subframe
  a radio frame
  a symbol time length
  a symbol In one exemplary embodiment, the method also comprises receiving data related to the retransmission scheme. The data may comprise data packets. In this case the communication device 90 may calculate the CRC for a data packet to obtain the related retransmission feedback (i.e ACK or NACK) and transmits the related retransmission feedback according to the received FTI. Transmit the retransmission feedback according to the received FTI indicated time structure, e.g. a subframe.

In another exemplary embodiment of the method, the FTI indicator may indicate a time structure relative to the time structure in which the FTI was received. As an example, if the FTI indicates that the retransmission feedback is requested in e.g. "next-next" subframe, it may relate to the "next-next" subframe related to in which subframe the FTI was received.

In another exemplary embodiment of the method, the FTI indicator may indicate a time structure relative to the time structure in which data was received. E.g. if the FTI indicates that the retransmission feedback is requested in e.g. the "next-next" subframe, it may relate to the "next-next" subframe in relation to timestructure in which the data was received, in particular the last DL subframe of a bundle of subframes comprising data, e.g. data related to the retransmission scheme.

In another exemplary embodiment of the method, a format of the received data is based on the FTI. If e.g. the FTI indicates that retransmission feedback is requested in "this subframe", the received data may not fully occupy a full DL subframe as illustrated in FIG. 1. If e.g the FTI indicates that retransmission feedback is requested in "next subframe" the DL subframe can be fully occupied with DL data as illustrated in FIG. 2, where the first DL subframe is fully occupied with data. The format of the received data may consequently be based on the FTI.

The FTI may be received in a Downlink Control Information. DCI, as defined in e.g. LTE. The DCI may comprise FTI which may be valid for one or several DL subframes, e.g. until next DCI is received. It shall be mentioned that the FTI is not necessarily received in every DL subframe. The FTI may be received together with data in a time structure.

According the above, the main steps performed by a communication device, 90, for transmitting retransmission feedback may be summarized as follows and are shown in FIG. 11:

receiving 52 a feedback timing indicator, FTI, and transmitting 54 retransmission feedback based on the feedback timing indicator.

Since the method in the communication device 90, may perform the complementary steps to the method described above, in relation the method in the communication device 80, the same advantages are achieved by carrying out the method in the communication device 90, as e.g.:

enabling flexible timing of retransmission feedback enabling trade-off between latency and capacity enabling short latency if load is low avoiding inter dependency between subframes optimizing a trade-off between fulfilling latency requirements and saving battery in case of poor radio coverage.

According to embodiments herein, there is further provided a communication device 90 adapted to transmit retransmission feedback for communication over a communication link 70 wherein the communication link supports a retransmission scheme and wherein the communication device 90 is further adapted to: receive a feedback timing indicator, FTI, and transmit retransmission feedback based on the feedback timing indicator.

Details regarding features of the corresponding method embodiment have already been provided above so it is considered unnecessary to repeat such details. This goes for all embodiments related to the communication device 90 that will be disclosed below.

In an exemplary embodiment, the communication device 90 is disclosed, wherein the FTI is received in a time structure.

In another exemplary embodiment, the communication device 90 is disclosed, wherein the FTI indicates a time structure In another exemplary embodiment, the communication device 90 is disclosed, wherein the time structure comprises at least one of:

a transmission time interval a subframe a radio frame a symbol time length a symbol In another exemplary embodiment, the communication device 90 is disclosed, the communication device is further adapted to receive data related to the re-transmission scheme.

In another exemplary embodiment, the communication device 90 is disclosed, wherein the FTI indicates a time structure relative to the time structure in which the FTI is received In another exemplary embodiment, the communication device 90 is disclosed, wherein the FTI indicates a time structure relative to the time structure in which the data is received In another exemplary embodiment, the communication device 90 is disclosed, wherein retransmission feedback relates to the retransmission scheme.

In another exemplary embodiment, the communication device 90 is disclosed, wherein a format of the received data related to the re-transmission scheme, is based on the FTI.

According to embodiments herein, there is further provided, as disclosed above a communication device 90, comprising a processor and a memory, wherein the memory comprises instructions executable by the processor whereby the communication device 90 is operative to and/or adapted to perform the main steps for transmitting retransmission feedback and may thus be summarized as follows and is shown in FIG. 11:

receive a feedback timing indicator, FTI, and transmit retransmission feedback based on the feedback timing indicator.

As disclosed above the same advantages as previously disclosed in relation to the method performed by/in the communication device 90 are hereby also achieved.

According to embodiments herein, there is further proved a communication device 80 adapted to control the timing for feedback, the communication device 80 comprises a transmitter module 82 for transmitting a feedback timing indicator, FTI, wherein the indicator is selected from a set of indicators.

According to embodiments herein, there is further proved a communication device 90 adapted to transmit retransmission feedback, the communication device 90 comprises a receiver module 92 receiving a feedback timing indicator, FTI and a transmitter module 93 for transmitting retransmission feedback, based on the feedback timing indicator, FTI.

According to embodiments herein, there is disclosed a communication device 80, adapted to control the timing of feedback transmissions for communication over a communication link 70, wherein the communication link supports a retransmission scheme and wherein the communication device 80 comprising a processing circuitry and a memory, said memory containing instructions executable by said processor whereby said communication device is operative to transmit a feedback timing indicator, FTI, wherein the indicator is selected from a set of indicators.

According to embodiments herein, there is disclosed a communication device 90, adapted to transmit retransmission feedback for communication over a communication link 70, wherein the communication link supports a retransmission scheme and wherein the communication device 90 comprising a processing circuitry and a memory, said memory containing instructions executable by said processor whereby said communication device is operative to receive a feedback timing indicator, FTI, and transmit retransmission feedback based on the feedback timing indicator.

Figure 12:
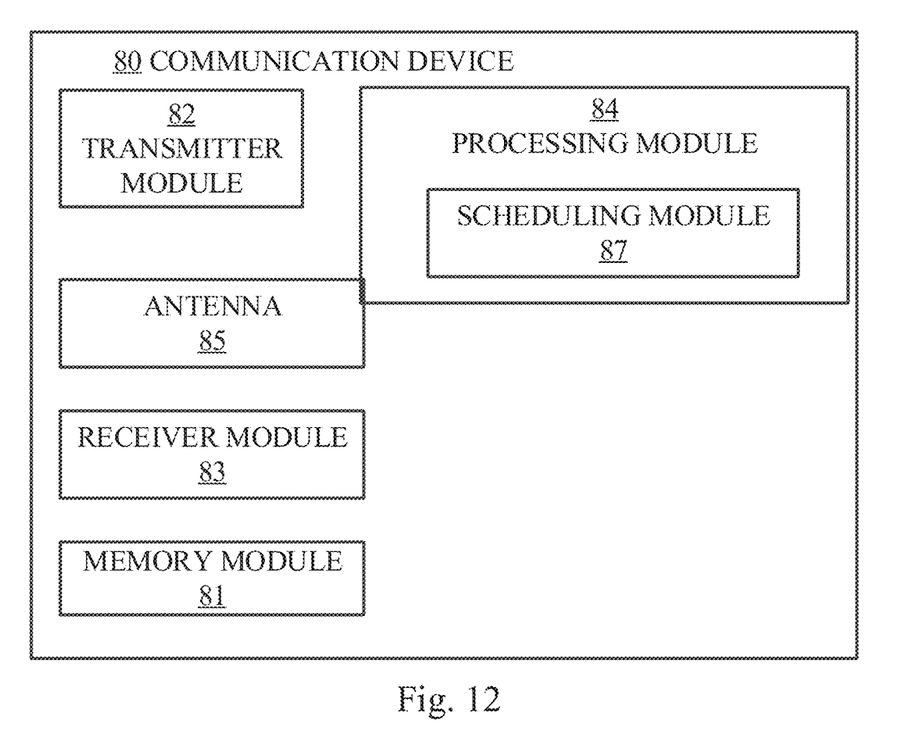
FIG. 12 is a block diagram illustrating a communication device 80, according to exemplary embodiments herein.

Referring to FIG. 12 there is illustrated a block diagram of exemplary components of a communication device 80 in accordance with previously disclosed embodiments. The communication device 80 may comprise a transmitter circuit or transmitter module 82; a receiver circuit or a receiver module 83; a processor 84 or a processing module or processing circuitry; a memory or memory module 81 and optionally an antenna 85.

An antenna 85 may include one or more antennas to transmit and/or receive radio frequency (RF) signals over the air interface. Antenna 85 may, for example, receive RF signals from transmitter circuit 82 and transmit the RF signals over the air interface to one or more wireless devices e.g. UEs or STAs and receive RF signals over the air interface from the one or more wireless devices e.g. UEs or STAs and provide the RF signals to receiver circuit 83.

A processing module/circuit 84 includes a processor, microprocessor, an application specific integrated circuit (ASIC), field programmable gate array (FPGA), or the like. The processor 84 controls the operation of the communication device 80 and its components. Memory (circuit or module) 85 includes a random access memory (RAM), a read only memory (ROM), and/or another type of memory to store data and instructions that may be used by processor 84. The communication device 80 may comprise additional components not shown in FIG. 12.

The memory 81 may comprise instructions executable by the processor 84 whereby the communication device 80 is operative to perform the previously described method steps. There is also provided a computer program comprising computer readable code means which when run in the communication device 80, e.g. by means of the processor 84 causes the communication device 80 to perform the above described method steps which include: to transmit a feedback timing indicator, FTI, wherein the indicator is selected from a set of indicators.

Figure 13:
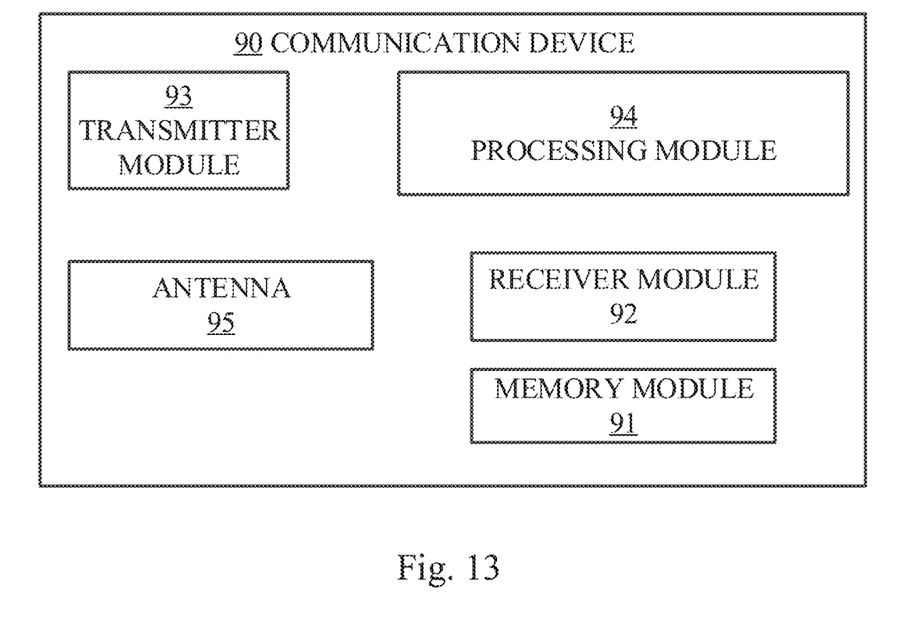
FIG. 13 is a block diagram illustrating a communication device 90, according to exemplary embodiments herein.

Referring to FIG. 13 there is illustrated a block diagram of exemplary components of a communication device 90 in accordance with previously disclosed embodiments. The communication device 90 may comprise a transmitter circuit or transmitter module 93; a receiver circuit or a receiver module 92; a processor 94 or a processing module or processing circuitry; a memory or memory module 91 and may optionally also comprise one antenna 95, The antenna 95 may include one or more antennas to transmit and/or receive radio frequency (RF) signals over the air interface. The antenna 95 may, for example, receive RF signals from the transmitter circuit 93 and transmit the RF signals over the air interface to one or more radio network nodes i.e. radio base stations e.g. eNodeBs or eNBs or APs and receive RF signals over the air interface from the one or more radio base stations e.g. eNodeBs or eNBs or APs and provide the RF signals to receiver circuit 92.

Processing module/circuit 94 includes a processor, microprocessor, an application specific integrated circuit (ASIC), field programmable gate array (FPGA), or the like. Processor 94 controls the operation of the communication device 90 and its components. Memory (circuit or module) 91 includes a random access memory (RAM), a read only memory (ROM), and/or another type of memory to store data and instructions that may be used by processor 94. The communication device 90 may comprise additional components not shown in FIG. 13.

The memory 91 may contain instructions executable by the processor 94 whereby the communication device 90 is operative to perform the previously described method steps. There is also provided a computer program comprising computer readable code means which when run in the communication device 90 e.g. by means of the processor 94 causes the communication device 90 to perform the above described method steps, which include: receive a feedback timing indicator, FTI, and to transmit retransmission feedback based on the feedback timing indicator. This may be done by means of the processing module 94, the receiver module 92 and the transmitter module 93.

Feedback may be retransmission feedback related to a data packet transmitted using a retransmission scheme such as e.g. ARQ and/or HARQ where the feedback indicates if the related data packet has been received correctly or not.

A communication device may take and/or have the role of a transmitting device and/or a receiving device.

A transmitting device may transmit data packets in a DL subframe and/or parts of a DL subframe and may receive retransmission feedback related to transmitted data packets, in a UL subframe and/or part of an UL subframe.

A receiving device may receive data packets in a DL subframe and/or parts of a DL subframe and may transmit retransmission feedback related to transmitted data packets in a UL subframe and/or parts of an UL subframe.

A part of an UL- or DL subframe may e.g. be a symbol. A symbol may be a shorter time structure than a subframe. A shorter time structure may mean that the time length of a symbol is shorter than for a subframe. A symbol may generally comprise one or more guard intervals, in particular a cyclic prefix. A symbol may have a symbol time length, which may be predetermined, e.g. by a standard, and/or be associated to a symbol time interval. There may be predefined different symbol time lengths, which may be associated to different symbols or different types of symbols. A symbol may represent and/or refer to a time interval in which a signal comprising a modulated and/or encoded (e.g., for error correction) block of data (e.g., a given number of bits, depending on modulation or encoding) is transmitted (or received). It is noted that a subframe may comprise symbols. The number of symbols comprised in one subframe mat depend on e.g. the symbol time interval. The number of bits transmitted with a symbol may depend on the modulation and may contain the smallest resolution of modulated and coded bits.

Whether a subframe in this application is defined as an UL- or DL subframe, may be determined in relation to the content of the subframe. A DL subframe may be a subframe that is transmitted by a transmitting device, wherein the subframe comprises data packets.

An UL subframe may be a subframe that is transmitted by a receiving device wherein the subframe comprises retransmission feedback related to data packets which have been transmitted in a DL subframe by a transmitting device.

A data stream may e.g. be a sequence of data packets between two or more communication devices in a communication system.

At each end of a data stream, there may be a communication device. A communication device in this context may be a transmitting device if it transmits a data packet on e.g. a DL subframe and receives retransmission feedback, related to the transmitted data packets, on an UL subframe. A communication device may be referred to as a receiving device if it receives a data packet on a DL subframe and transmits retransmission feedback, related to the transmitted data packets, on an UL subframe. It shall be noted that by the above definition, that the UL and DL are defined based on the content of the transmission. According to the traditional definition, the downlink carries transmissions from a base station to a UE or mobile phone. However, in this disclosure a traditional DL subframe may be referred to as an UL subframe. E.g. a UE is considered to have the role of a transmitting device and consequently the UE receives retransmission feedback from the base station. Retransmission feedback is sent on UL subframes and in this example the base station will send the retransmission feedback. This means that the base station transmits the retransmission feedback on UL subframes as opposed to the traditional "downlink" direction which is usually determined as the direction from the base station to the UE.

A communication device is generally a radio base station, sometimes also referred to in the art as a macro base station, a node B, or B-node, an eNodeB (eNB), and is sometimes also referred to in the art as a micro/femto/pico base stations, a micro/femto/pico node B, or micro/femto/pico B-node, a micro/femto/pico eNodeB (eNB), an access node or an access point or a relay node. Besides, the communication device could also be any other device in the communication system, such as any form of devices enabled to communicate via a communication system, such as mobile telephones ("cellular" telephones) and laptops with mobile termination, and thus can be, for example, portable, pocket, hand-held devices, such as mobile phones, smart phones, personal digital assistants (PDA); computer-included devices, such as desktops, laptops; vehicles, or other devices, such as meters, household appliances, medical appliances, multimedia devices or any machine type communication (MTC) device such as sensors, actuators, etc., which provides voice and/or data communication, in particular delay sensitive communication.

A feedback timing indicator (FTI) relating to a time structure may mean that the FTI indicates a defined position in a time structure. It could be indicating an absolute instance of a time structure such as a subframe identified by its subframe number or a symbol position within a subframe and/or that the FTI indicates a time structure in relation to an absolute and/or specific instance of a time structure. The latter example may be referred to as if the FTI indicates a relative position in a time structure.

A communication system may be any communication system as defined by 3GPP, such as UMTS, LTE, GSM, CDMA2000 or a core network such as EPS or any combination of those.

A communication link is a communications channel that connects two or more communication devices. A communication link may be an actual physical link or it may be a logical link that uses one or more actual physical links. Examples of a physical link may e.g. be a radio link between e.g a UE and an eNB, an optical fiber between nodes in a communication system or a copper cable or a coaxial cable or any other carrier of information or any combination thereof.

A communication link may support a re-transmission scheme, such as ARQ and/or HARQ. If the communication link supports a retransmission scheme, the communication devices and/or receiving devices, at the end of the communication link can use retransmission feedback to indicate, to a communication device and/or transmitting device, whether a data packet is received correctly or not.

Figure 9:
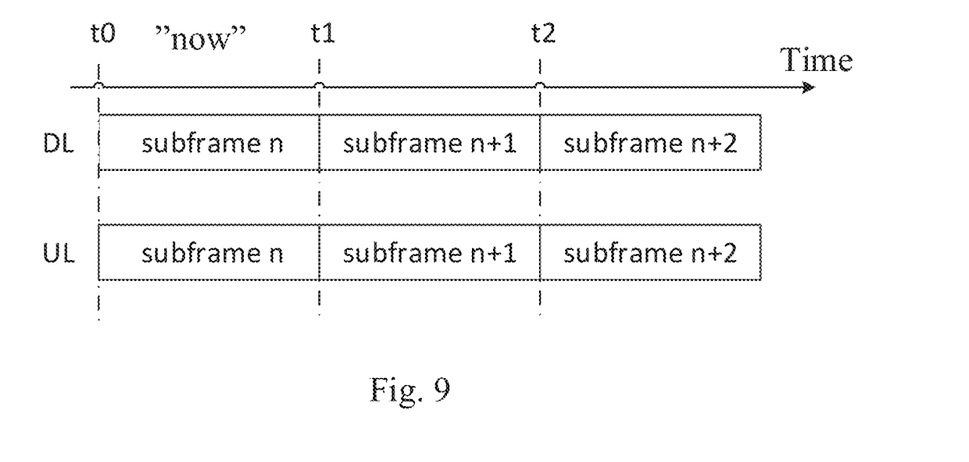
FIG. 9 illustrates corresponding UL- and DL subframes

Now referring to FIG. 9. In the figure it is illustrated corresponding UL- and DL subframes. For simplicity, no effects of propagation delay or related time shifts are considered. If it is imagined that current absolute time is between t0 and t1 on the time line, one may say that the current subframe is subframe n. If retransmission feedback is requested in the same subframe, in relation to the current subframe, it is requested to be transmitted, by a receiving device, in UL subframe n. In relation to the current subframe, the feedback can be requested in the next subframe, then feedback would be transmitted in UL subframe n+1 and analogously if feedback is requested in the next-next subframe, it would be requested to be transmitted in UL subframe n+2.

Receiving retransmission feedback in the same subframe may mean that the retransmission feedback is received, by a transmitting device, before the DL subframe has timed out and/or that the feedback is transmitted by the receiving device before the DL subframe has ended and/or that that the feedback is transmitted by the receiving device before the corresponding UL subframe has ended.

Receiving retransmission feedback in the same subframe may mean that the retransmission feedback is received, by a transmitting communication device, in an UL subframe corresponding to the DL subframe comprising a data packet to which the retransmission feedback relates.

Receiving retransmission feedback in the next subframe may mean that the retransmission feedback is received, by a transmitting device, before the next DL subframe has timed out and/or that the feedback is transmitted by the receiving device before the next DL subframe has ended and/or that that the feedback is transmitted by the receiving device before the corresponding next UL subframe has ended.

Receiving retransmission feedback in the next-next subframe may mean that the retransmission feedback is received, by a transmitting communication device, in an UL subframe corresponding to the next-next DL subframe comprising a data packet to which the retransmission feedback relates.

Next subframe and next-next subframe are related to the current subframe, which may be the subframe in which the Feedback Timing Indicator, FTI, is transmitted from the transmitting device. I.e. the next subframe may be the next sequential and/or the next adjacent, in time, subframe in a series of subframes.

Retransmission feedback may be called ARQ- or HARQ feedback.

A corresponding subframe relates to the timing between UL- and DL subframes. An UL- and DL subframe are corresponding if their timings are in a specific timing relation to each other.

Figure 6:
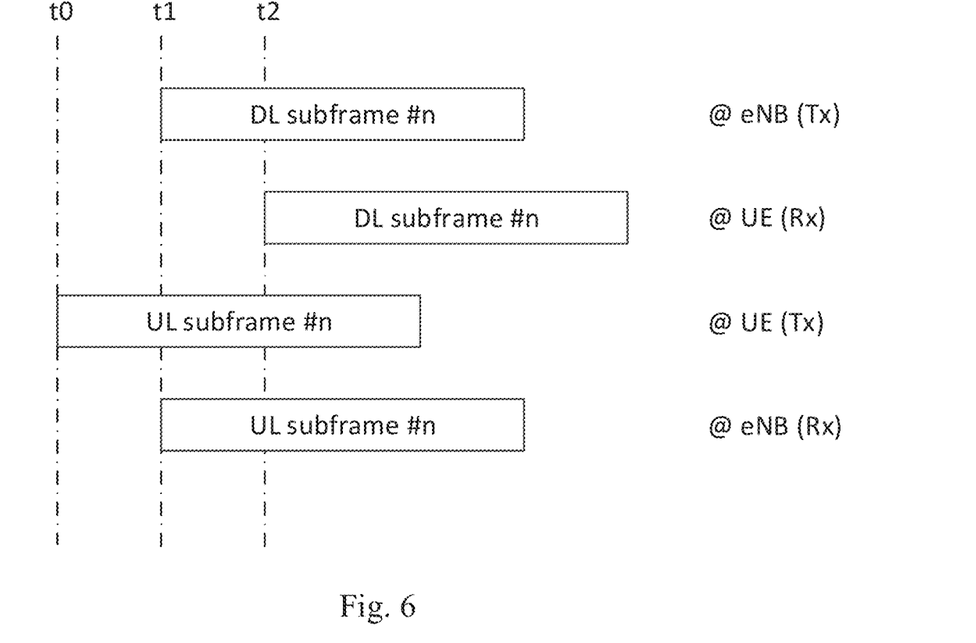
FIG. 6 illustrates an example with subframes that are synchronized at an eNB.

A specific timing relation may relate to propagation delay and/or other delays and/or time shifts, such as configured delays and/or time shifts and or similar adaptations to effects caused by propagation delays and adaptations to time structures in the communication system An example of a specific timing relation is shown in FIG. 6, which illustrates an example where transmitted DL subframes and received UL subframes are synchronized at an eNB. Another example of a specific timing relation would be where transmitted DL subframes and received UL subframes don't have the same timing but a timing that is offset by a certain time shift and/or delay.

Referring to FIG. 6, one can observe the timing of corresponding UL- and DL subframes in the receiving device (Rx). In this figure a UE has the role of a receiving device, and the eNB has the role of a transmitting device. If the eNB, in this example, transmits a data packet on DL subframe #n, the transmission starts at t1. The beginning of this DL subframe #n will arrive at the UE at t2 due to propagation delay. Roughly the same propagation delay can be expected when transmitting from the UE to the eNB. Therefore, the UE has to transmit its corresponding UL subframe, which corresponds to the DL subframe #n, at t0 in order for the UL subframe #n to be synchronized with the DL subframe #n in the eNB. The synchronization, with respect to propagation delay, between the communication devices may be controlled with timing advance (TA). The amount of propagation delay is related to the distance between the transmitting device and the receiving device. The configuration of timing advance may impact the transmission start time of an UL subframe.

A corresponding subframe relates to the timing between UL- and DL subframes. An UL- and DL subframe may be corresponding if they are assigned the same subframe number.

A bundle of subframes may comprise two or more consecutive and/or non-consecutive subframes which may comprise data related to a retransmission scheme.

Data and/or FTI and/or DCI being received in a time structure may relate to being comprised in a transmitted corresponding time structure, wherein information is coded and/or modulated according to a standard in order to enable that information, such as FTI and/or data and/or DCI may be conveyed between communication devices 80, 90.

A regular DCI may comprise configuration information to control the code rate and/or modulation and coding scheme (MCS) and/or message size and/or transport block size and/or carrier to use and/or frequency to transmit on, for the receiving device 90, which may be used when transmitting requested retransmission feedback and/or UL data. This may enable an adoption of the transmission format in the UL subframe, to the current channel conditions and may consequently improve the reliability of the UL transmission.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP and IEEE802.11EEE has been used in this disclosure to exemplify the invention, this should not be seen as limiting the scope of the invention to only the aforementioned system. Other communication systems, including LTE or LTE-A (LTE-Advanced) and WiMax may also benefit from exploiting the ideas covered within this disclosure.

What is claimed is:

1. A method for controlling the timing of feedback transmissions from a receiving device by a transmitting device communicating over a communication link, wherein the communication link supports a retransmission scheme and wherein the method comprises:
   transmitting a first feedback timing indicator (FTI) and data, wherein the first FTI indicates no specific subframe in which retransmission feedback is requested; and
   transmitting a second FTI, wherein the second FTI indicates when retransmission feedback related to the data is requested.

2. The method according to claim 1, further comprising receiving retransmission feedback, related to the retransmission scheme, according to the second FTI.

3. The method according to claim 1, wherein the first FTI indicates that a further FTI will be transmitted to indicate when the retransmission feedback related to the data is requested, the further FTI being the second FTI.

4. A method for transmitting retransmission feedback by a receiving device communicating with a transmitting device over a communication link, wherein the communication link supports a retransmission scheme and wherein the method comprises:
   receiving a first feedback timing indicator (FTI) and data related to the retransmission scheme, wherein the first FTI indicates no specific subframe in which retransmission feedback is requested;
   receiving a second FTI that indicates when retransmission feedback related to the data is requested; and
   transmitting retransmission feedback related to the data based on the second FTI.

5. The method according to claim 4, wherein the first FTI indicates that a further FTI will be transmitted to indicate when the retransmission feedback related to the data is requested, the further FTI being the second FTI.

6. A transmitting device configured to control the timing of feedback transmissions from a receiving device over a communication link, wherein the communication link supports a retransmission scheme and wherein the transmitting device comprises:
   transmitting circuitry; and
   processing circuitry configured to:
      transmit, via the transmitting circuitry, a first feedback timing indicator (FTI) and data, wherein the first FTI indicates no specific subframe in which retransmission feedback is requested; and
      transmit, via the transmitting circuitry, a second FTI, wherein the second FTI indicates when retransmission feedback related to the data is requested.

7. The transmitting device according to claim 6, wherein the transmitting device further comprises receiving circuitry, and wherein the processing circuitry is configured to receive, via the receiving circuitry, retransmission feedback, related to the retransmission scheme, according to the second FTI.

8. The transmitting device according to claim 6, wherein the first FTI indicates that a further FTI will be transmitted to indicate when the retransmission feedback related to the data is requested, the further FTI being the second FTI.

9. A receiving device configured to transmit retransmission feedback to a transmitting device over a communication link, wherein the communication link supports a retransmission scheme and wherein the communication device comprises:
   receiving circuitry;
   transmitting circuitry; and
   processing circuitry configured to:
      receive, via the receiving circuitry, a first feedback timing indicator (FTI) and data related to the retransmission scheme, wherein the first FTI indicates no specific subframe in which retransmission feedback is requested;
      receive a second FTI that indicates when retransmission feedback related to the data is requested; and
      transmit retransmission feedback related to the data based on the second FTI.

10. The receiving device according to claim 9, wherein the first FTI indicates that a further FTI will be transmitted to indicate when the retransmission feedback related to the data is requested, the further FTI being the second FTI.

* * * * *

UNITED STATES PATENT AND TRADEMARK OFFICE
CERTIFICATE OF CORRECTION

PATENT NO. : 11,711,175 B2
APPLICATION NO. : 17/331680
DATED : July 25, 2023
INVENTOR(S) : Parkvall et al.

Page 1 of 2

It is certified that error appears in the above-identified patent and that said Letters Patent is hereby corrected as shown below:

On the Title Page

Item (74), under "Attorney, Agent, or Firm", in Column 2, Line 2, delete "Homilier," and insert -- Homiller, --, therefor.

In the Specification

In Column 6, Lines 1-14, delete " " and insert -- In other words, it can be said that the scheduling command may comprise a timing indicator, indicating when retransmission feedback shall be transmitted by the receiving device, 90. Such a timing indicator, will be called a Feedback Timing Indicator, FTI. One example of a FTI is shown in Table 1 and another example of an FTI is depicted in Table 2. --, therefor.

In Column 8, Line 55, delete "Fri. If." and insert -- FTI. If, --, therefor.

In Column 9, Line 1, delete "structure." and insert -- structure, --, therefor.

Signed and Sealed this
Fifth Day of December, 2023

Katherine Kelly Vidal
*Director of the United States Patent and Trademark Office*

In Column 9, Line 3, delete "embodiment." and insert -- embodiment, --, therefor.

In Column 11, Lines 25-26, delete "Information." and insert -- Information, --, therefor.